US008113736B2

(12) United States Patent
Wilson, Sr.

(10) Patent No.: US 8,113,736 B2
(45) Date of Patent: Feb. 14, 2012

(54) PAVEMENT RESURFACING EQUIPMENT AND METHOD OF APPLICATION OF POLYMER EMULSION

(76) Inventor: Jack H. Wilson, Sr., Ridgeland, MS (US)

( * ) Notice: Subject to any disclaimer, the term of this patent is extended or adjusted under 35 U.S.C. 154(b) by 111 days.

(21) Appl. No.: 12/318,191

(22) Filed: Dec. 23, 2008

(65) Prior Publication Data

US 2010/0158608 A1    Jun. 24, 2010

(51) Int. Cl.
*E01C 19/18* (2006.01)
*C04B 24/24* (2006.01)

(52) U.S. Cl. .............. 404/72; 404/75; 404/90; 404/101; 404/105; 404/107; 404/108; 404/111

(58) Field of Classification Search ............ 404/93–111, 404/114, 118
See application file for complete search history.

(56) References Cited

U.S. PATENT DOCUMENTS

| | | | | |
|---|---|---|---|---|
| 2,255,346 | A | * | 9/1941 | Baily ............................ 404/102 |
| 3,333,518 | A | * | 8/1967 | Sholl et al. ..................... 404/92 |
| 4,020,211 | A | | 4/1977 | Eigenmann |
| 4,172,063 | A | | 10/1979 | O'Brill |
| 4,195,952 | A | * | 4/1980 | Swanson .................... 405/259.3 |
| 4,630,963 | A | | 12/1986 | Wyman |
| 4,688,964 | A | * | 8/1987 | Cox ................................ 404/75 |
| 4,708,978 | A | * | 11/1987 | Rodgers ........................... 524/5 |
| 4,789,265 | A | | 12/1988 | Wilson |
| 4,906,126 | A | | 3/1990 | Wilson |
| 4,917,533 | A | | 4/1990 | Wilson, Sr. |
| 5,021,476 | A | | 6/1991 | Pinomaa |
| 5,079,095 | A | | 1/1992 | Reed |
| 5,234,128 | A | | 8/1993 | Hill |
| 5,352,158 | A | | 10/1994 | Brodeur, Jr. |
| 5,362,178 | A | | 11/1994 | Schantz |
| 5,422,162 | A | | 6/1995 | Passarino |
| 5,472,737 | A | | 12/1995 | Anders |
| 5,494,741 | A | | 2/1996 | Fekete |
| 5,735,952 | A | | 4/1998 | Wilson, Sr. |
| 5,947,635 | A | | 9/1999 | Wilson, Sr. |
| 5,980,664 | A | | 11/1999 | Wilson, Sr. |
| 6,020,073 | A | | 2/2000 | Wilson, Sr. |

(Continued)

OTHER PUBLICATIONS

International Preliminary Report on Patentability Jul. 7, 2011.

(Continued)

*Primary Examiner* — Raymond Addie
(74) *Attorney, Agent, or Firm* — Merek, Blackmon & Voorhees, LLC (57) ABSTRACT

One embodiment of the invention relates to a flexible sled that conforms to the contour of the pavement for applying a liquid emulsion onto a pavement surface comprising a rigid frame with flexible squeegee assembly adapted to be towed along a pavement surface. Another embodiment of the invention includes a hopper assembly for distributing aggregate. Another embodiment of the invention includes a sled for repairing ruts in wheel lanes of a road. Another aspect of the invention is a polymer emulsion composition having a high coefficient of friction comprising a mixture of polymer resin blended with a mixture of cement and angular sand aggregate and titanium dioxide to provide a solar reflectance index number that ranges from 0.30 to 0.38 and a friction number in the range of 45 to 55. Another aspect of the invention is a polymer emulsion for sealing open graded bituminous asphalt comprising a mixture of polymer resin blended with a mixture of cement and angular sand aggregate which will provide a friction number in the range of 45 to 55 when the ratio of aggregate to cement is 70/30.

16 Claims, 13 Drawing Sheets

U.S. PATENT DOCUMENTS

| | | |
|---|---|---|
| 6,102,615 A | 8/2000 | Wilson, Sr. |
| 6,624,232 B2 | 9/2003 | Wilson, Sr. |
| 6,997,122 B1 | 2/2006 | Guzman |
| 2004/0247388 A1 | 12/2004 | Lloyd |
| 2007/0104537 A1 | 5/2007 | Becker et al. |
| 2007/0204683 A1 | 9/2007 | Halliday |
| 2008/0168926 A1* | 7/2008 | Muller et al. ................. 106/668 |
| 2008/0275149 A1 | 11/2008 | Ladely et al. |
| 2009/0148683 A1* | 6/2009 | Ilfrey ........................... 428/215 |

OTHER PUBLICATIONS

PCT/US09/06658 International Search Report; Apr. 30, 2010.

* cited by examiner

PAVEMENT RESURFACING EQUIPMENT AND METHOD OF APPLICATION OF POLYMER EMULSION

FIELD OF THE INVENTION

The present invention relates to pavement resurfacing equipment and methods of application of polymer emulsions as well as formulations of the polymer emulsion.

BACKGROUND OF THE INVENTION

In recent years, pavement sealing has become an important aspect of preservation of pavement surfaces including roads, bridge decks, runways, driveways and parking lots. Proper sealing of pavement surfaces extends the life of the pavement and delays or avoids costly repaving. However current sealing technology is made from bituminous materials and is black which adds to the heat absorption into asphalt pavement. A further development in pavement sealing is the use of polymer emulsions to seal the pavement. An example of polymer emulsions used for sealant compositions can be found in my prior U.S. Pat. No. 6,624,232 titled "Pavement Sealing Composition and Method of Application". This sealant composition permits a very thin layer to be applied to pavement surfaces such as asphalt which when dry forms a hard flexible, and durable coating which adheres to the pavement surface and provides a high friction surface.

However, it has been found that the friction coefficient can be increased through the use of improved application equipment and a modified polymer emulsion that meets LEED requirements, as will be described herein. Furthermore, through the use of new application techniques as will be described, the friction coefficient can be varied during the application process by modification of the friction inducing components including angular aggregate of the polymer emulsion. In addition, anti-ponding grooves can be added during the application process and surface treatment can be applied to specific areas of the pavement surface such as heavily traveled areas such a wheel lanes to refurbish the pavement surface as needed. Additional objects and advantages of the invention will become apparent upon reading of the detailed description of the invention in conjunction with the accompanying drawings.

OBJECTS AND SUMMARY OF THE INVENTION

It is an object of the invention to provide an improved machine for the application of a polymer emulsion on a concrete or bituminous pavement surface to seal the pavement and provide a high friction surface.

Another object of the invention is to provide an improved formulation of a polymer emulsion material.

Yet another object of the invention is to provide a new machine for the application of a polymer emulsion to wheel lanes of a road to repair the wheel lanes and reduce plastic rutting.

Yet another object of the invention is to provide an apparatus for the application of anti-ponding grooves to a pavement surface.

Still another object of the invention is provide a surface coating that has increased solar reflectivity and lowers the urban heat index due to heat absorption in asphalt.

Yet another object of the invention is to provide the ability to repair cracks in bituminous and concrete highway surfaces simultaneously with laying down the surface coat.

Still another object of the invention is a method of providing variable skid resistance to a pavement surface.

Yet another object of the invention is to provide a pavement sealing composition that can be used with open graded asphalt for increased flexibility In summary, one embodiment of the invention relates to a flexible sled that conforms to the contour of the pavement for applying a liquid emulsion onto a pavement surface comprising a rigid frame with flexible assembly adapted to be towed along a pavement surface in a first direction of travel wherein said frame assembly having a plurality of elongated members forming an emulsion receiving area bounded by said frame members and a pair of said frame members extending parallel to said first direction of travel and forming a first side member and a second side member each of said first and second side members having end blades connected thereto for contacting the pavement surface and for supporting said its respective side member wherein said end blades being formed of brushes.

Another embodiment of the invention includes a hopper assembly for distributing aggregate comprising, a frame for supporting a container for aggregate, the frame having wheels and the container having a bottom having an opening for releasing aggregate from said container and a pneumatically operated moveable gate attached to said container for regulating the release of aggregate from said container; and a vibrator attached to said gate to facilitate the flow of aggregate from said opening.

Another embodiment of the invention includes a sled for repairing ruts in wheel lanes of a road, comprising a rectangular box having four side walls and a bottom opening wherein the box is adapted for attachment to a tow vehicle and one of said side walls forming a front wall and the front wall having a receiving opening adapted to receive a liquid polymer emulsion and the front wall further including a bottom edge having a squeegee mounted thereon, said squeegee being operable to prevent the flow of the emulsion forward of said box and two of said side walls forming sides of said box and extending perpendicular to said front wall, each of said sides including a lower edge having brushes connected thereto for preventing the liquid polymer emulsion from flowing under said sides and another of said side walls forming a rear wall with the rear wall having a second squeegee attached thereto, said second squeegee being adapted to pass over the polymer emulsion as the sled is being towed by a tow vehicle; whereby, as the sled is towed by a tow vehicle, the polymer emulsion flows into said box and fills any ruts in a wheelpath in the road and said second squeegee creates a flat pavement surface.

Another embodiment of the invention includes a method of applying a polymer emulsion to a pavement surface using a flexible sled, comprising attaching to a tow vehicle a flexible sled having a rigid frame assembly adapted to be towed along a pavement surface in a first direction of travel, said frame assembly having a plurality of elongated members forming an emulsion receiving area bounded by said frame members, a pair of said frame members extending parallel to said first direction of travel and forming a first side member and a second side member, each of said first and second side members having end blades connected thereto for contacting the pavement surface and for supporting said its respective side member, said end blades being formed of brushes and a front frame member extending between and connecting said first and second side members, a middle frame member spaced from said front frame member and extending between said first and second side members, a rear flexible frame member spaced from both said front and said middle frame member;

with a spring steel center section to allow the frame to follow the contour of the surface, said front frame member includes a squeegee extending downwardly therefrom for preventing said liquid emulsion from flowing under said front frame member and said middle frame member and rear frame member each having a squeegee extending downwardly therefrom for applying said emulsion to the pavement when said sled is in motion while applying a predetermined quantity of polymer emulsion at a predetermined rate to an area of pavement bounded by said front frame member, said side frame members and said middle frame member and towing said sled over a pavement surface wherein said polymer emulsion flows under said middle frame member and said rear frame member to apply a thin coating of polymer emulsion to the pavement surface; and, allowing said thin coating of polymer emulsion to dry.

Another aspect of the invention is a polymer emulsion composition having a high coefficient of friction comprising a mixture of polymer resin blended with a mixture of cement and angular sand aggregate and titanium dioxide to provide a solar reflectance index number that ranges from 0.30 to 0.38 and a friction number in the range of 45 to 55.

Another aspect of the invention is a polymer emulsion for sealing open graded bituminous asphalt comprising a mixture of polymer resin blended with a mixture of cement and angular sand aggregate which will provide a friction number in the range of 45 to 55 when the ratio of aggregate to cement is 70/30.

DETAILED DESCRIPTION OF THE PREFERRED EMBODIMENT OF THE INVENTION

This invention is primarily directed to the sealing and resurfacing of pavement on roads including bituminous pavement, asphalt and chip seal roads, airport tarmacs, parking lots and driveways. The equipment used to apply the polymer emulsion creates a thin layer over the pavement that results in a high friction surface without adding a topical application that "polishes" over time. The sealant composition in the form of a polymer emulsion permits a very thin layer to be applied to pavement surfaces such as bituminous materials and asphalt, which when dry forms a hard and durable coating which adheres to the pavement surface and provides a high friction surface. The polymer emulsion contains a special blend of quartz aggregate that eliminates the need to pre-fill cracks in asphalt. The aggregate mixture strengthens the formula and is forced down into cracks during the application process using a sled 10. The polymer emulsion coats the wall of the crack and cements the stones in place and eliminates erosion from water. The aggregate load forms a protective crust that will last for many years.

Now with reference to the FIGS. 1 through 8, a sled 10 is shown being drawn by a tow vehicle 12. Tow vehicle 12 supports a mixing tank 14 containing the polymer emulsion. Sled 10 is preferably formed by a frame assembly 16 having a front frame member 18, side frame members 20, 22, 24 and 26, a middle frame member 28 and a flexible rear frame member 30. Frame members 18, 28 and 30 are positioned transverse to the direction of travel of the tow vehicle 12.

Figure 1:
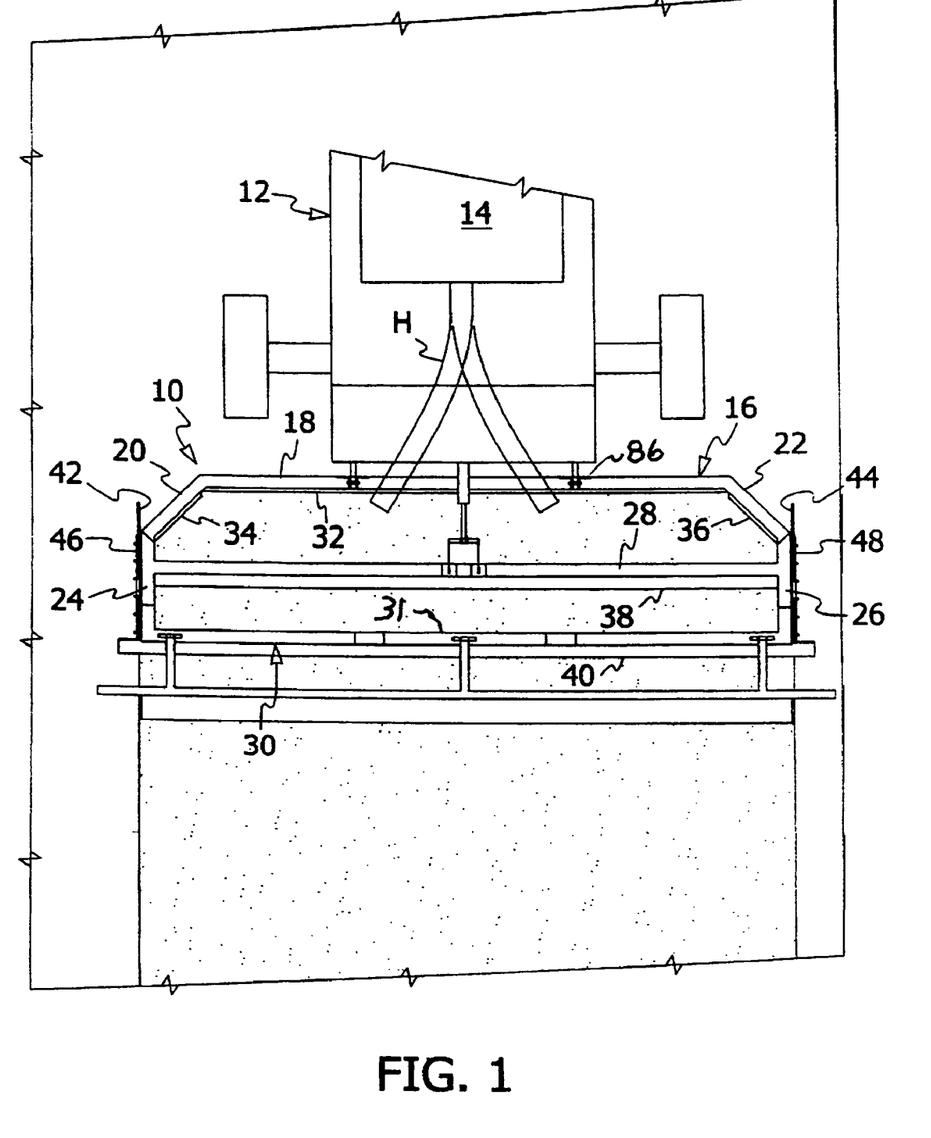
FIG. 1 is a top plan view of the sled used in applying the polymer emulsion to a pavement surface.
Figure 2:
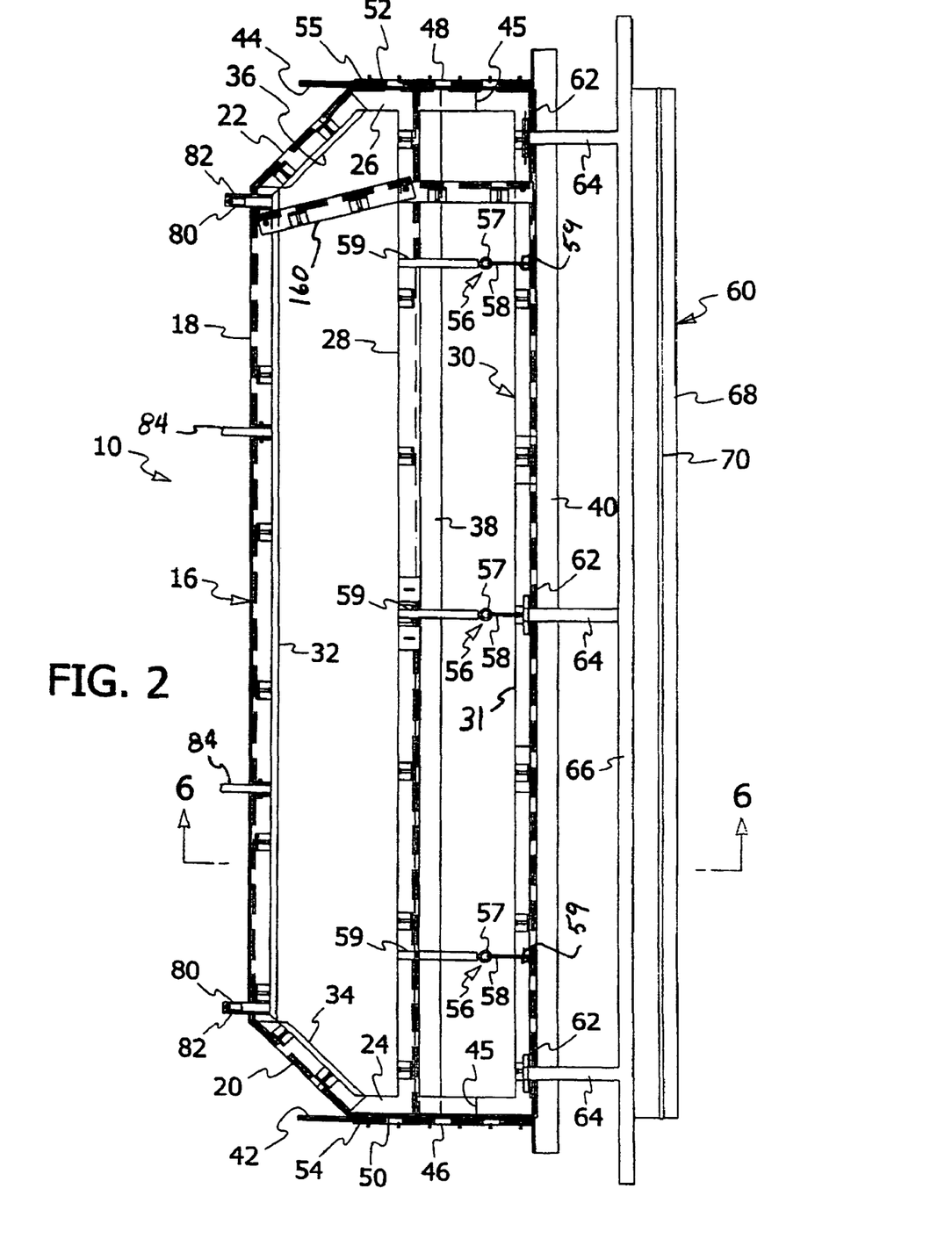
FIG. 2 is an enlarged view of the sled of FIG. 1.
Figure 3:
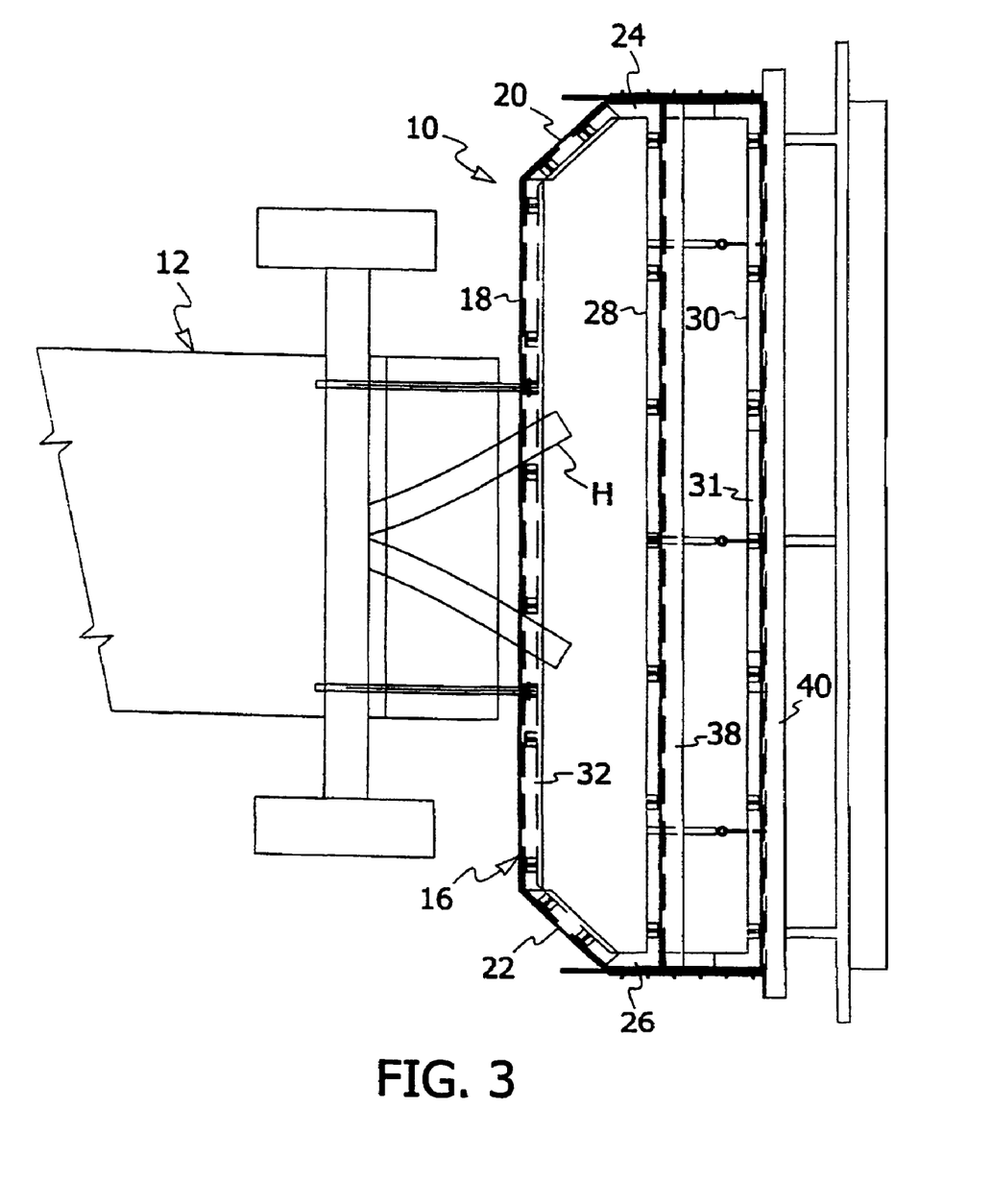
FIG. 3 is a bottom view of the sled of FIG. 1.
Figure 3A:
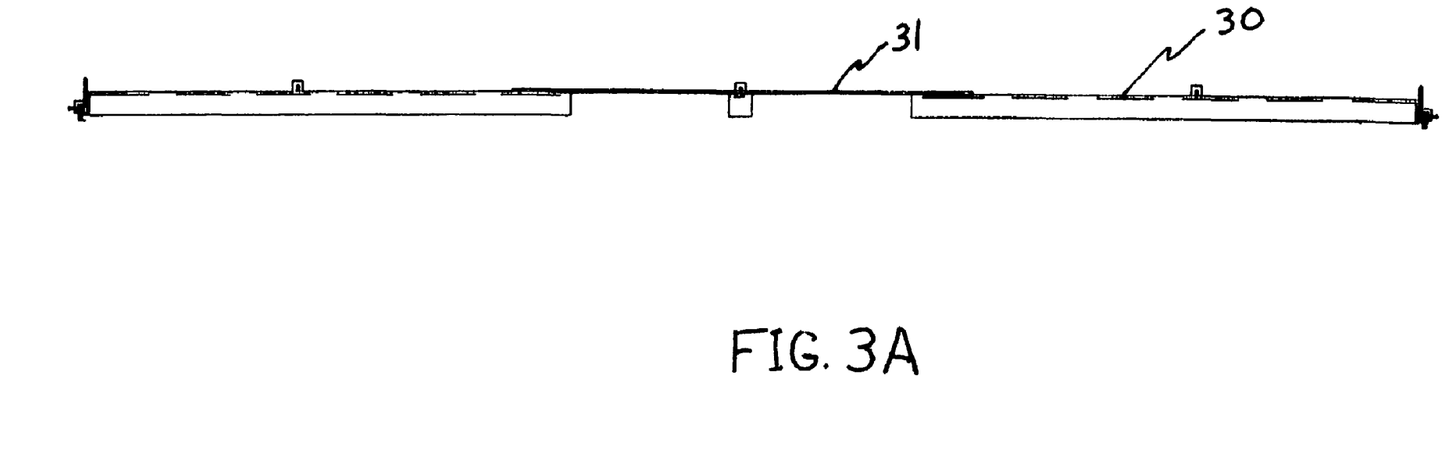
FIG. 3A is an end view of the rear frame member of FIG. 1.
Figure 4:
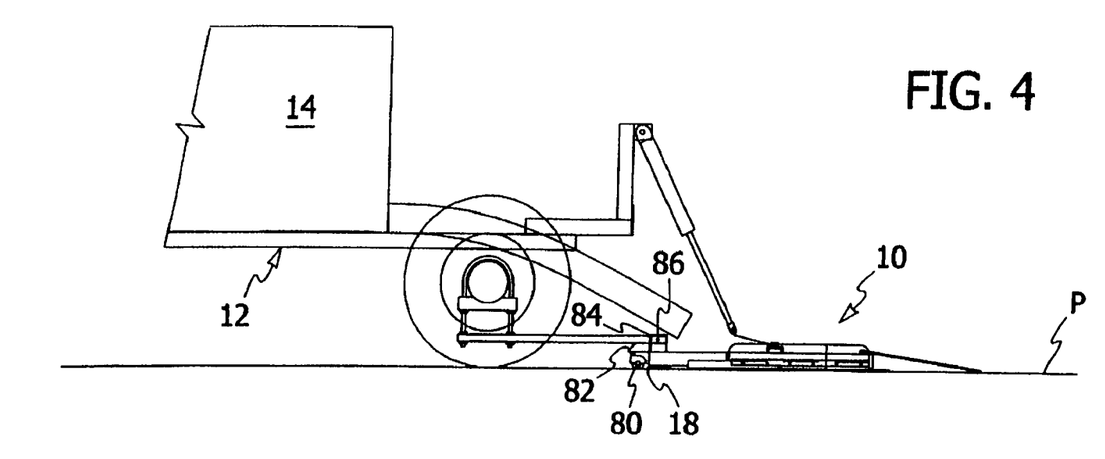
FIG. 4 is a side view of the sled of FIG. 1.

As shown in FIG. 3A, rear frame member 30 includes a central spring steel section 31 which permits the rear frame member 30 to flex when the sled 10 is drawn over curved or uneven pavement. The frame members 28 and 30 preferably extend across an entire travel lane, however, the width of the sled 10 may be varied depending on the pavement being coated. The frame assembly 16 is preferably formed of rigid material such as steel, but other materials such as rigid plastic or aluminum could also be used. Front frame member 18, side frame members 20 and 22 and middle and rear frame members 28 and 30 each have a squeegee 32, 34, 36, 38 and 40, respectively attached thereto and the squeegees 32, 34, 36, 38 and 40 are positioned to extend downwardly from its respective frame member.

Squeegees 32, 34, 36, 38 and 40 are preferably made of ¼ inch thick 35 to 40 durometer pure gum rubber having 3400 PSI tensile strength and conforms to ASTM D2000-AA-430. Side frame members 24 and 26 have brushes 42 and 44 respectively attached thereto and extend downwardly therefrom and support the side frame members 24 and 26 above the pavement P. Side frame members 24 and 26 as well as brushes 42 and 44 each have a separation or gap 45 which allows the rear frame member 30 to float freely over the pavement P relative to front frame member 18 and middle frame member 28. The brushes 42 and 44 on side frame members 24 and 26 are held in place by rigid brackets 46 and 48 placed along the outside edges 50 and 52 of side frame members 24 and 26, respectively. Preferably the brackets 46 and 48 permit only about ½ inch of the brushes 42 and 44 to be exposed on the side facing the outside edges 50 and 52, whereas only about a ¼ inch of the brushes 42 and 44 are exposed by the outer walls 54 and 55 of the brackets 46 and 48, respectively. Keeping the brushes 42 and 44 substantially contained within their respective brackets 46 and 48 prevents the brushes 42 and 44 from spreading transversely to the direction of travel and thus improves retention of the polymer emulsion within the confines of the sled 10. The use of brushes 42 and 44 also reduces marring of the surface of the polymer emulsion as would happen if squeegees or rubber skids were used.

In use, the polymer emulsion is supplied from the mixing tank 14 through a hose H to the pavement area bounded by the front frame member 18 and side frame members 20 and 22 and middle frame member 28. Squeegees 32, 34 and 36 as well as brushes 42 and 44 act to contain the polymer emulsion from flowing beyond the front frame member 18 and side frame members 20, 22, 24, and 26 of the frame assembly 16. The squeegees 38 and 40 allow passage of a thin layer of polymer emulsion underneath when the sled 10 is in motion. The flexible rear frame member 30 is preferably flexibly connected to the middle frame member 28 by a pair of connectors 56 formed by a pair of eye bolts 57 and 58 which are connected to the middle frame member 28 and rear frame member 30 by brackets 59. The flexibility of the connection allows the rear frame member 30 to flex relative to the middle frame member 28 on uneven pavement to apply a consistent thickness of polymer emulsion to the pavement P.

A brush assembly 60 is preferably connected to the flexible rear frame member 30 by hinges 62. Struts 64 connect the brush head 66 to the hinges 62. The brush 68 extends outwardly from the brush head 66. A retaining band 70 may also be used to maintain the continuity of the brush 68 by keeping its bristles from spreading apart as the polymer emulsion builds up on the bristles. The brush 68 extends across the entire width of the sled 10 and passes over the applied polymer emulsion to eliminate any glaze on the top surface of the polymer emulsion and brings up the aggregate to ensure a high friction coefficient for the sealant. This eliminates the need to topically broadcast aggregate to achieve high friction. Alternatively, a fabric mat of burlap or other suitable material may be substituted for the brush 68.

Preferably, a pair of casters 80 are connected by brackets 82 to the front frame member 18. The casters 80 support the front frame member above the pavement P, but still allow the squeegees 32, 34 and 36 to remain in contact with the pavement P.

Figure 5:
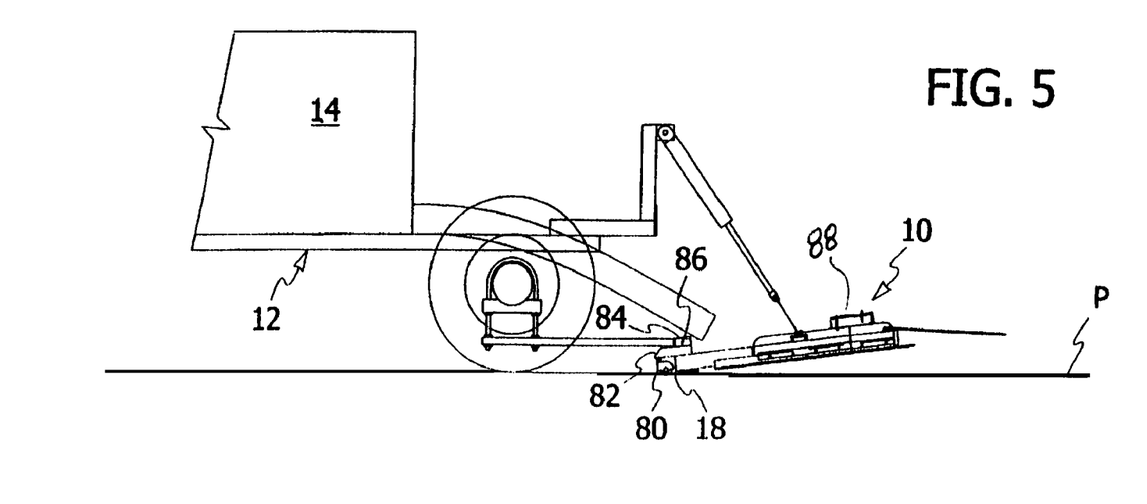
FIG. 5 is a side view of the sled of FIG. 1 in a lifted configuration.
Figures 6, 7, 8:
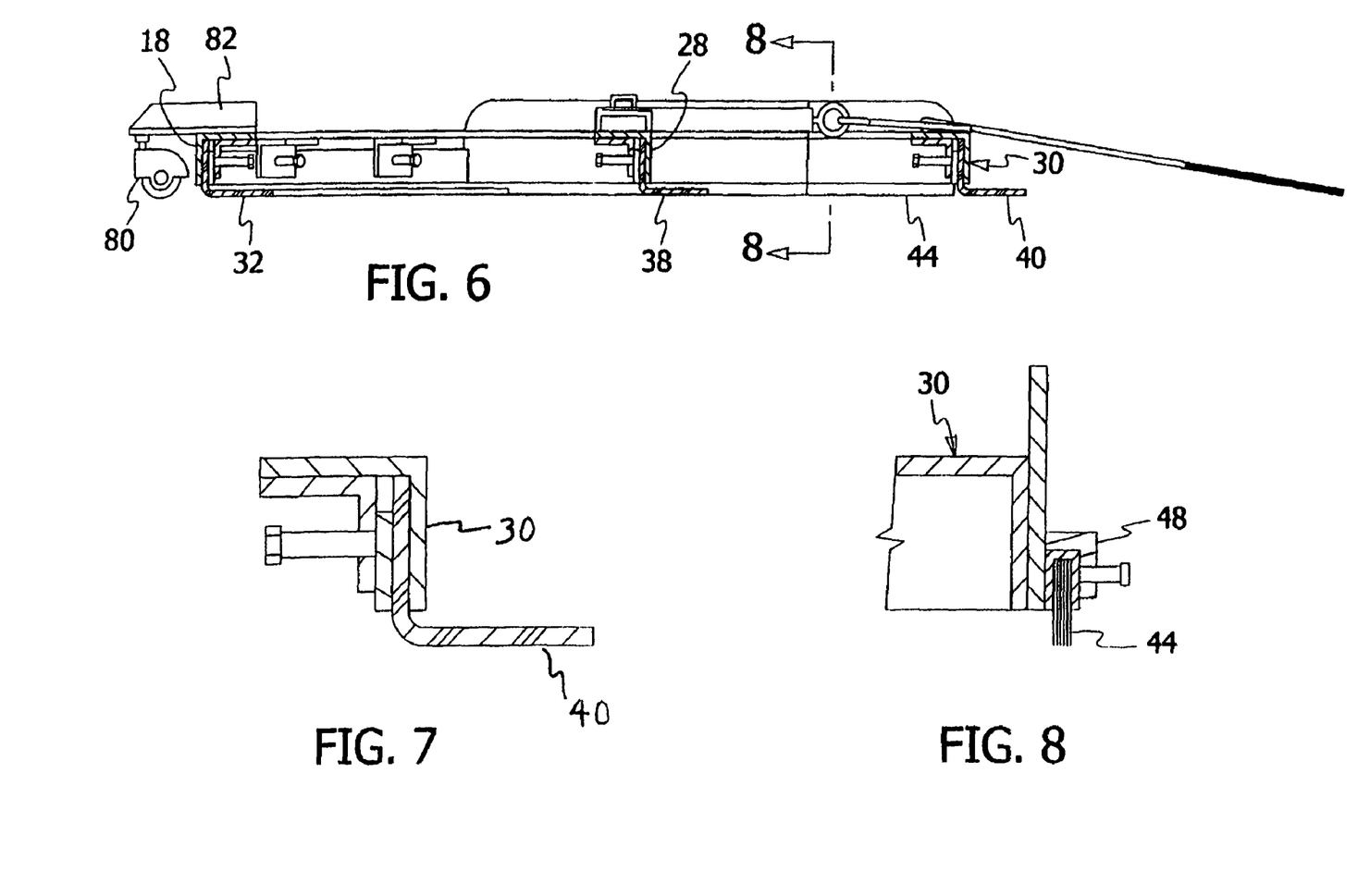
FIG. 6 is cross-sectional view of the sled of FIG. 1.
FIG. 7 is an enlarged section of a squeegee blade attached to the sled of FIG. 1.
FIG. 8 is an enlarged sectional view of the end blade of FIG. 6 taken along lines 8-8.

An additional pair of brackets 84 are located on the front frame member 18 and include pin receiving openings 86. The brackets 84 allow the sled 10 to be releasably and pivotally connected to the tow vehicle 12. When the sled 10 is not in use it can be lifted for transport. End support brackets 88 are attached to span gaps 45 when lifting of the sled 10 for transport is desired as shown in FIG. 5. End support brackets 88 bolt onto side frame members 24 and 26 and prevent rear frame member 30 from flexing during transport.

Figure 9:
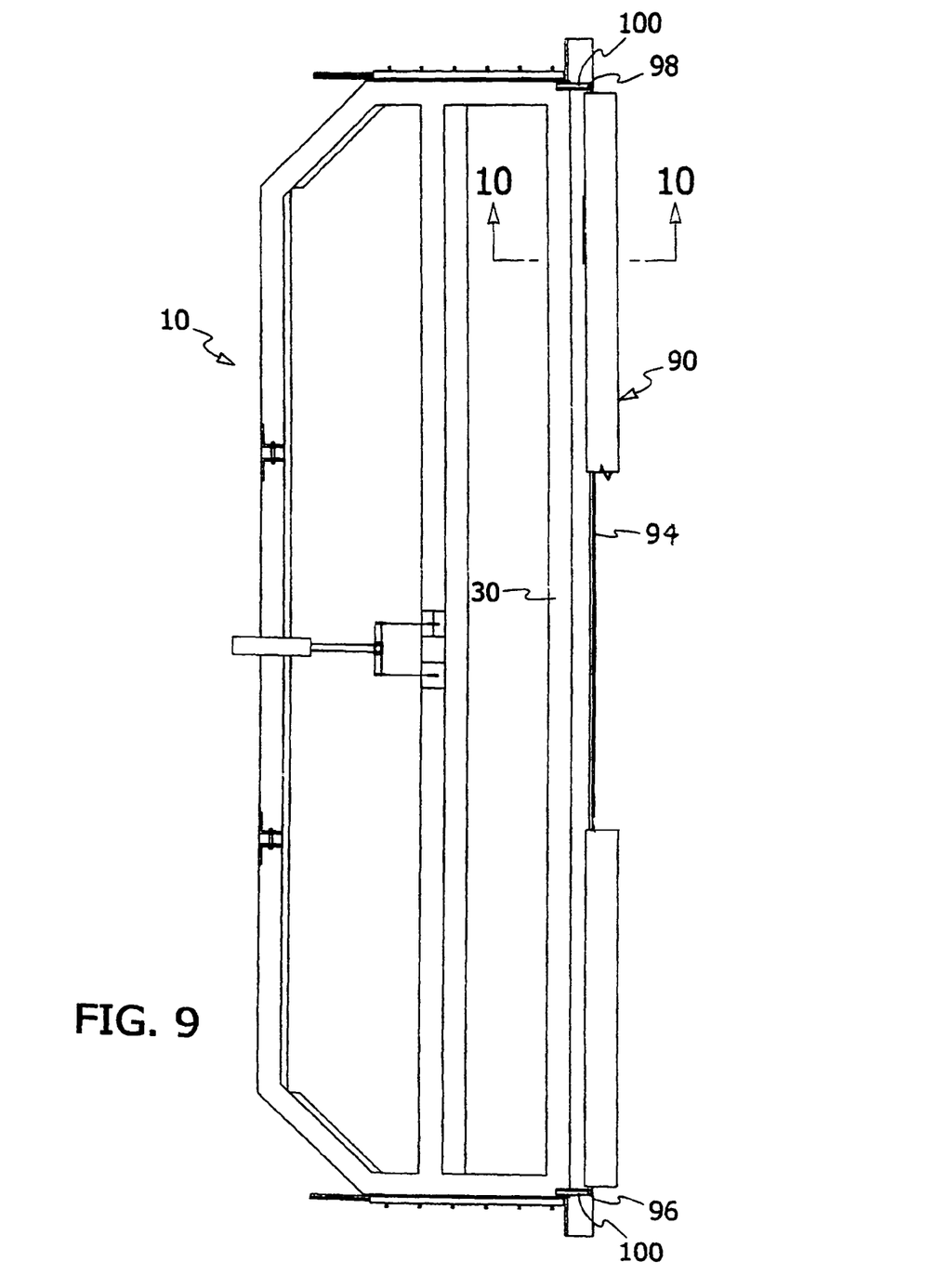
FIG. 9 is a top plan view of another embodiment of the sled having a groove making attachment.
Figure 10:
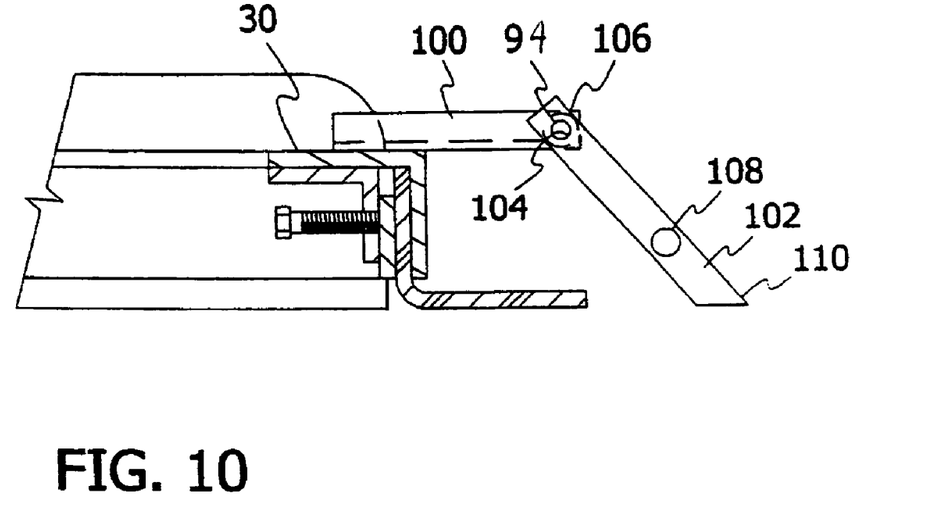
FIG. 10 is a side view of the groove making attachment of FIG. 9 taken along lines 10-10.
Figure 11:
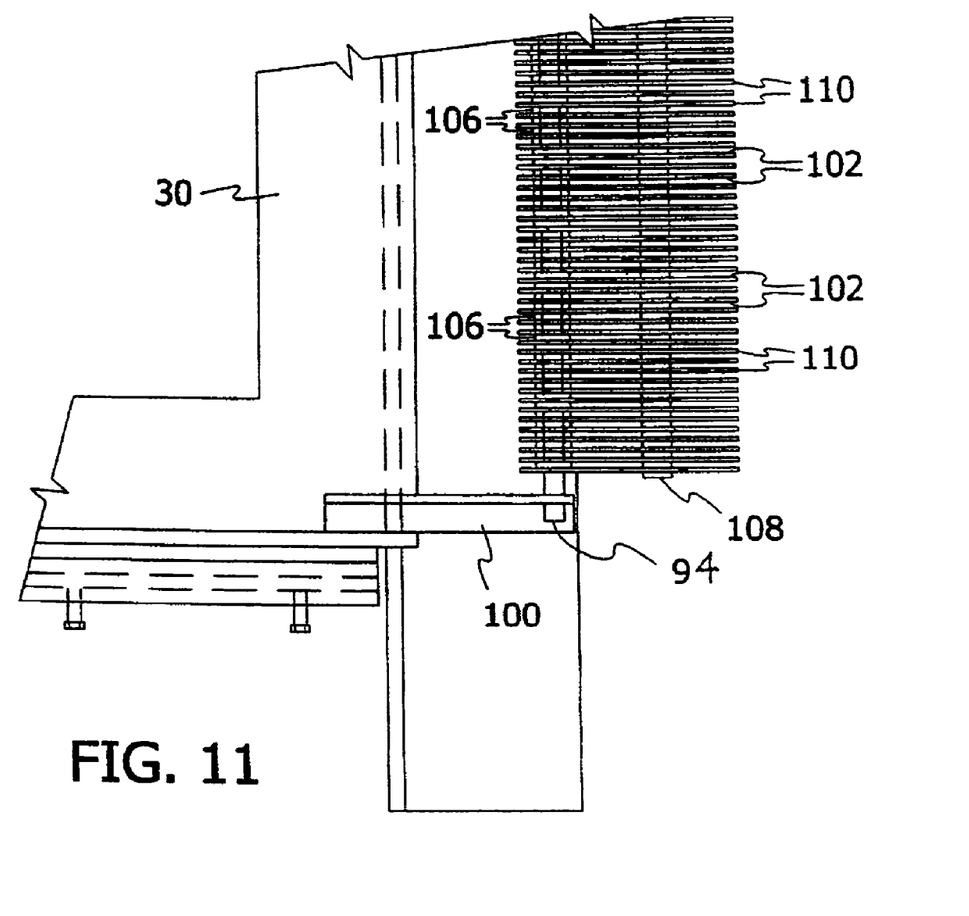
FIG. 11 is a top view with portions broken away of the groove making attachment of FIGS. 8 and 9.

An optional attachment can be added to the sled 10 to provide grooves in the polymer emulsion to create anti-ponding lines. As shown in FIGS. 9, 10 and 11 the grooving assembly 90 includes a rigid rod 94 preferably extending along the entire transverse width of the sled 10. Rod 94 is connected at its ends 96 and 98 to the rear frame member 30 by brackets 100. A plurality of elongated grooving plates 102 having rod receiving openings 104 are supported by the rod 94. The openings 104 are sized to allow the grooving plates 102 to freely rotate on the rod 94. The free rotation allows the grooving plates 102 to individually float and adjust to undulations in the pavement P. Preferably, spacers 106 in the form of thick washers are located on the rod 94 between each grooving plate 102 to maintain separation of the plates 102. Additional spacing devices 108 are located on each grooving plate 102 and spaced from the openings 104 to further maintain the spacing of the grooving plates 102. The pavement contacting ends 110 of the grooving plates 102 are angled to facilitate adjustment of the grooving plates to undulations in the pavement P. The addition of grooves to the polymer emulsion greatly reduces the possibility of ponding of rainwater on the pavement, thereby preventing hydroplaning by vehicles.

Figure 12:
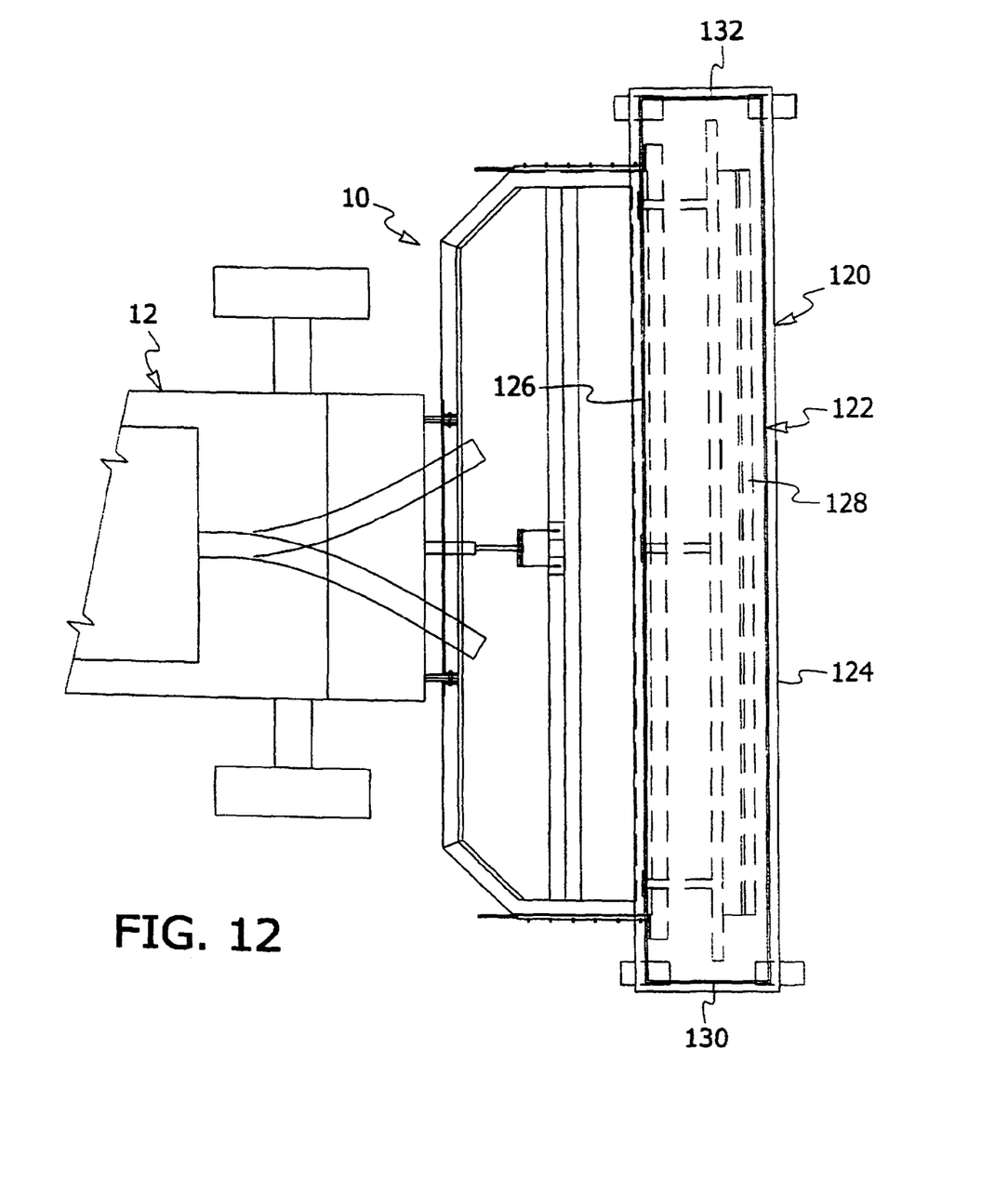
FIG. 12 is a top view of the hopper assembly.
Figure 13:
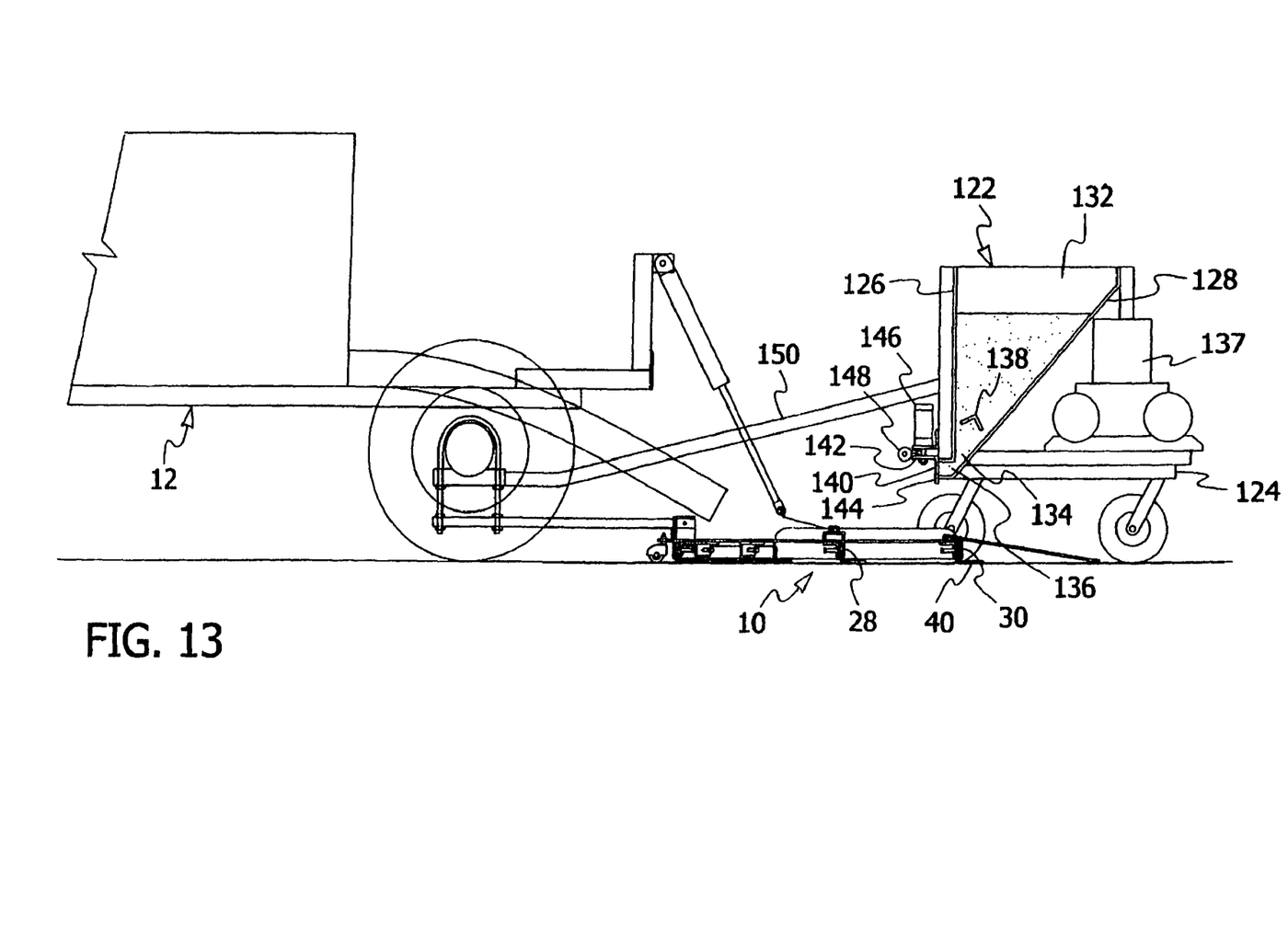
FIG. 13 is a side view of the hopper assembly of FIG. 12.
Figure 14:
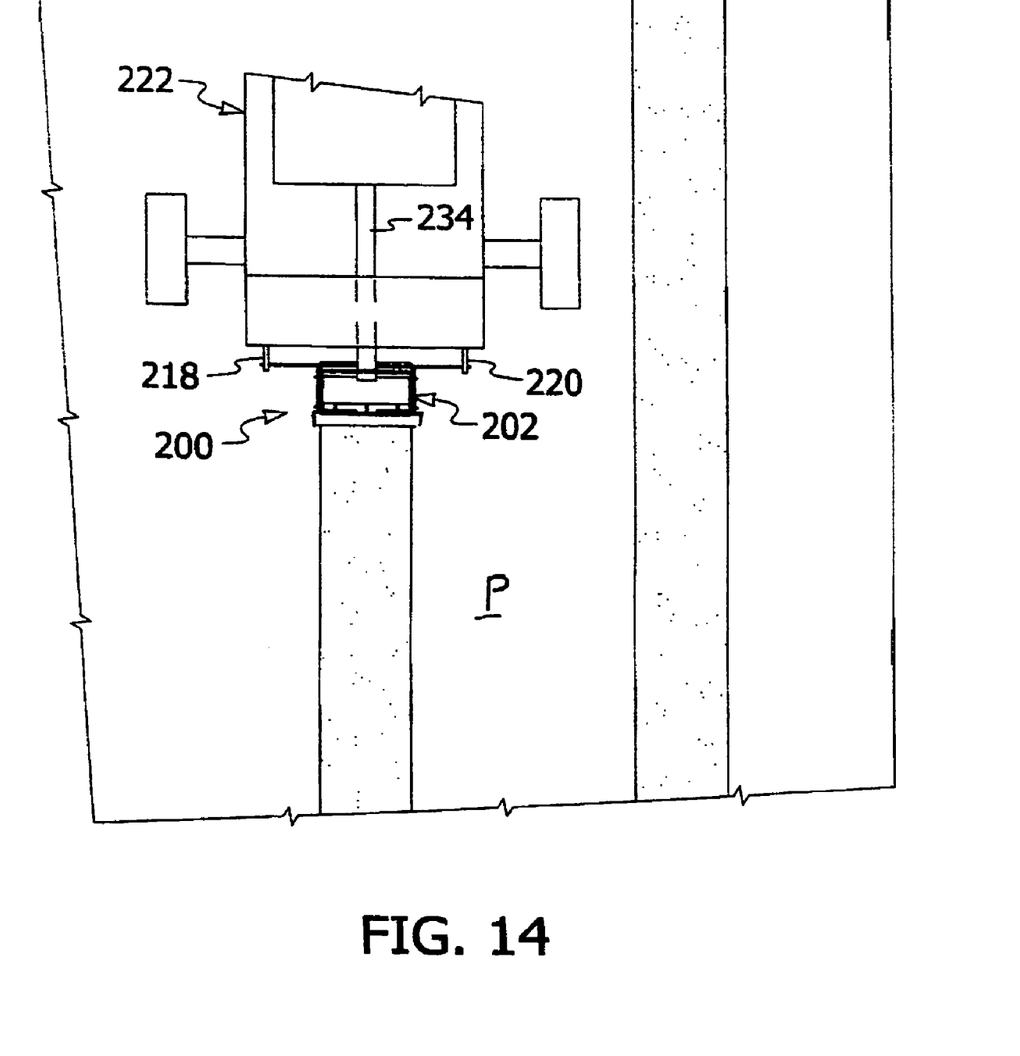
FIG. 14 is a top view of the rut repair sled.
Figure 15:
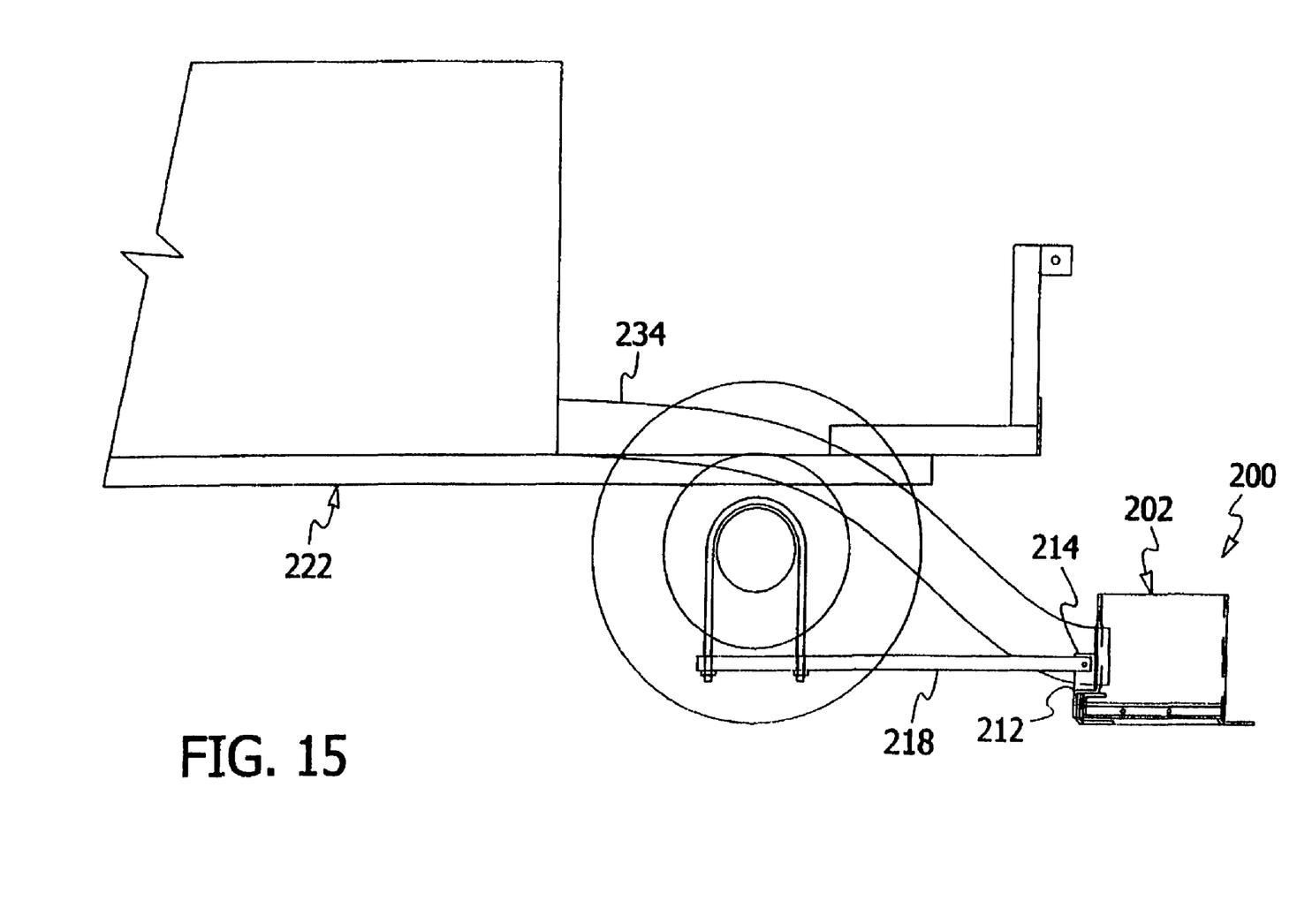
FIG. 15 is a side view of the rut repair sled of FIG. 14.
Figure 16:
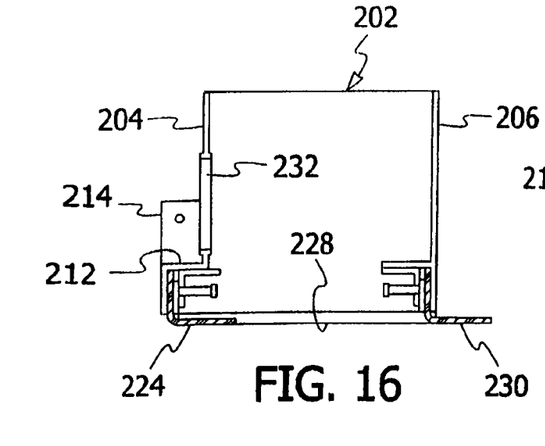
FIG. 16 is an enlarged side view of the rut repair sled of FIGS. 14 and 15.
Figure 17:
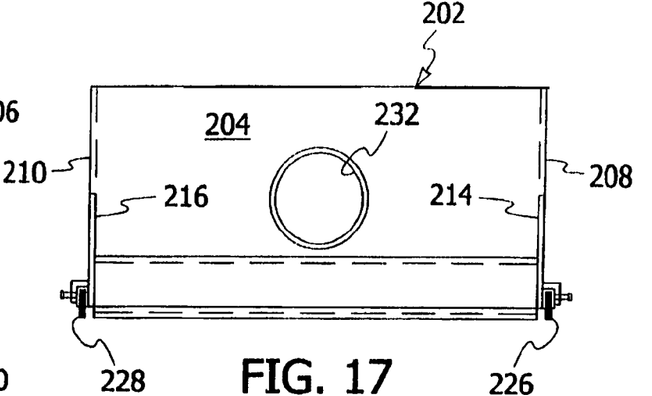
FIG. 17 is a front view of the rut repair sled of FIGS. 14 and 15.
Figure 18:
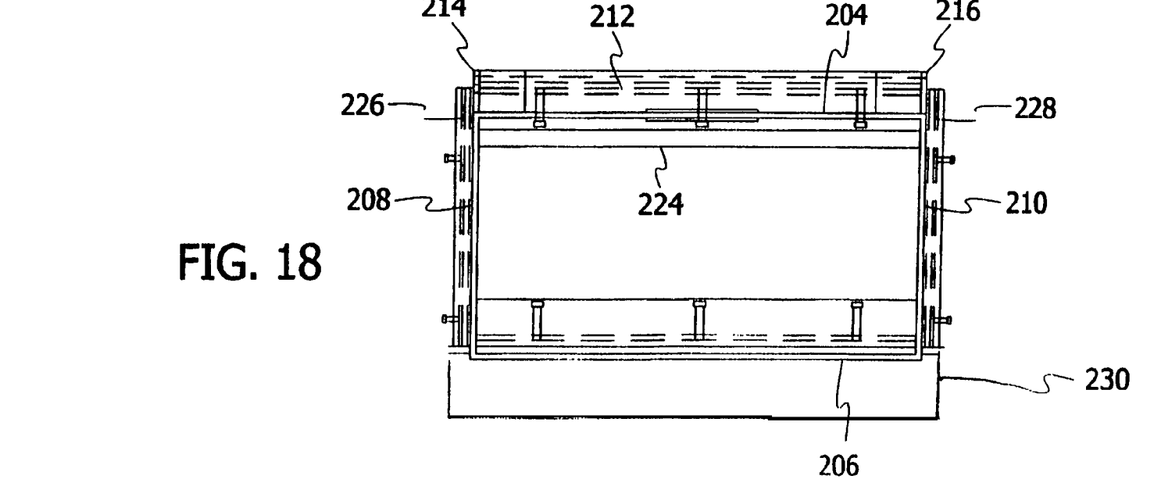
FIG. 18 is a top view of the rut repair sled of FIGS. 14 and 15.

Another optional attachment can be added to the sled 10 to add more and larger aggregate to the surface of the polymer emulsion. As shown in FIGS. 12 and 13, a hopper assembly 120 includes a container 122 for holding aggregate such as sand, salt, and/or gravel. The container 122 is supported by a wheeled frame 124. The container 122 has a vertical front wall 126 and an angled rear wall 128 and a pair of side walls 130, 132. The front wall 126 and rear wall 128 are spaced apart at the bottom 134 of the container 122 to allow for an opening 136 to permit the aggregate to flow out. Inside and extending the entire width of the container 122 and spaced upwardly from the bottom 134 is an angled deflector 138 which operates to separate the aggregate as it flows around the deflector 138. The deflector 138 helps to prevent clogging of the opening 136. At the bottom of the front wall 126 on the exterior thereof is an L-shaped flow regulator 140 having a top plate 142 and a closing plate 144. The flow regulator 140 is raised and lowered pneumatically by preferably three actuators 146 and when opened allows sand to flow from the container 122. Pneumatically operated vibrators 148 are attached to top plate 142 and operate to prevent clogging and facilitate the flow of sand through the opening 136. A compressed air source 137 such as a tank or compressor is carried by the hopper assembly and supplies compressed air to the actuators 146 and vibrators 148 by conventional air lines. A tow bar 150 connects the container 122 to the tow vehicle 12.

In use, the hopper assembly 120 is towed along with the sled 10 by the tow vehicle 12. As the polymer emulsion is poured from the holding tank into the sled 10, additional aggregate can be added from the container 122 into the space between the middle frame member 28 and the rear frame member 30. The aggregate falls on top of the polymer emulsion and is worked by the squeegee 40 on the rear frame member 30 as the squeegee 40 passes.

For applying the polymer emulsion to narrower travel lanes, an optional snap in place brush 160 can be located between front frame member 10 and middle frame member 28 can be added to apply reduced widths of polymer emulsion without changing sleds 10.

FIGS. 14 through 18 illustrate a device for repairing ruts in wheel lanes of a road. The sled 200 includes a rectangular box 202 which is preferably formed of rigid material such as steel, although other rigid materials such as plastic or aluminum could also be used. The box 202 includes a front wall 204, a rear wall 206 and side walls 208, 210. A flat plate 212 extends away from the lower end of front wall 204 and supports a pair of brackets 214, 216 for connecting the sled 200 to tow bars 218, 220 of a tow vehicle 222. A front squeegee 224 extends downwardly from the plate 212 the entire length of the front wall 204. A pair of brushes 226 and 228 are removeably connected at the bottom of side walls 208 and 210 respectively and each brush 226 and 228 extends downwardly its respective side wall 208 and 210. A rear squeegee 230 is connected to the bottom of rear wall 206. An opening 232 in the front wall 204 receives the polymer emulsion from the holding tank on the tow vehicle 222 via a hose 234.

In use, the sled 200 is dragged behind the tow vehicle 222. Preferably, the sled 200 is about the same width as a wheel lane. As the polymer emulsion is applied by the sled 200, the emulsion fills any ruts in the wheel lane and as the sled 200 passes, the rear squeegee 230 flattens the polymer emulsion. The front squeegee 224 along with brushes 226 and 228 prevent the polymer emulsion from leaking out the front and sides of the sled 200.

The following formulations were tested by International Cybernetics Corporation using its ASTM E274 locked wheel friction tester. The tests resulted in friction numbers that averaged 51.1. The preferred formulation of a first embodiment of the polymer emulsion used as the sealant composition and method of preparation for a batch size of fifty-five gallons will now be described.

In the initial step the following ingredients are combined:
Rohm and Haas Rhoplex E-330
Rohm and Haas Rocima 63
Emerald Foam Control Foam Blast 1063

Start the batch preparation with approximately 53 gals. of Rhoplex E-330. Add about 25 gallons of Rhoplex E-330 to a mixing vat. Mix at low speed in Scholds/Hockmyer style disperser. Add 32 oz of Emerald Foam Control FoamBlast 1063 to batch. Continue to mix at low speed for an additional 30 minutes. Slowly add remaining Rhoplex E-330 to batch. Mix at low speed for an additional 10 minutes. Add 2 lbs. of Rocima 63 to batch. Mix at low speed for an additional 10 minutes.

The next series of steps describes adding the Portland cement and sand mixture at the job site. In the next step, Portland cement and aggregate are added to the above ingredients. The ratio of aggregate to cement is 70/30.

Add 25 gals of water to the mixing vat and continue to mix for 3 minutes. The sand mixture preferably includes 1100 lbs. of Unimin Corp. #2095 quartz sand or similar sized aggregate, with the remaining 1,700 lbs. of sand being of varying gradation from about 50 down to 100 mesh sieve size. Next add the 2,800 lbs. of aggregate and the Portland cement to the mixing vat and continue to mix for 4 minutes. Unimin 2095 Granusil is a quartz sand which provides non-skid properties and enhances the filling of cracks and openings in the pavement surface. Similar sized aggregate with abrasive texture may also be used The water used in mixing the polymer emulsion should be of potable quality and free from harmful-soluble salts.

A second embodiment describes the solar reflective sealant composition and method of preparation as follows:

Start the batch preparation with approximately 53 gals. of Rhoplex E-330. Add about 15 gallons of Rhoplex E-330 to a mixing vat. Set the Scholds/Hockmyer style disperser at a high speed setting. Add 32 oz of Supersperse 100. Continue to mix at high speed for 3 minutes. Slowly add 25 lbs. of titanium dioxide to mix and continue to mix at high speed for 45 minutes. Next add 32 oz of FoamBlast 1063 to batch and mix at low speed for 10 minutes. Slowly add 35 gals. of Rhoplex E-330 to batch. Mix at low speed for 10 minutes. Add 2 lbs. of Rocima 63 to batch. Mix at low speed for 10 minutes.

In the next step, Portland cement and sand are added to the above ingredients. The ratio of sand to cement is 70/30.

Add 25 gals of water to the mixing vat and continue to mix for 3 minutes. The sand mixture preferably includes 1100 lbs. of Unimin Corp. #2095 quartz sand or similar aggregate with the remaining 1,700 lbs. of sand being of varying gradation from about 50 down to 100 mesh sieve size. Next add the 2,800 lbs. of sand and the Portland cement to the mixing vat and continue to mix for 4 minutes. Unimin 2095 Granusil is a quartz sand which provides non-skid properties and enhances the filling of cracks and openings in the pavement surface.

This embodiment increases solar reflectivity resulting in a lower urban heat absorption index than asphalt and produces an S.R.I (Solar Reflectance Index) number that ranges from 0.30 to 0.38. This allows the material to qualify as a LEED material. Lower heat absorption also reduces plastic rutting in wheel lanes on roads.

Titanium dioxide also acts to retard bacterial growth on pavement surfaces.

These formulations of the polymer emulsion are particularly suited for use with open graded bituminous pavement which requires a sealant layer. Traditionally, a process such as Densiphalt® pavement uses a concrete mortar to seal the voids in the bituminous pavement road surface. However, the concrete mortar is not flexible and therefore cracks when heavy equipment travels over the surface. The polymer emulsions described herein result in a sealant layer which is flexible and therefore resists cracking under heavy loads.

While this invention has been described as having a preferred design, it is understood that it is capable of further modifications, uses and/or adaptations of the invention following in general the principle of the invention and including such departures from the present disclosure as come within the known or customary practice in the art to which the invention pertains and as maybe applied to the central features hereinbefore set forth, and fall within the scope of the invention and the limits of the appended claims.

I claim:

1. A flexible sled for applying a liquid emulsion onto a pavement surface comprising:
   a) a rigid frame assembly adapted to be towed along a pavement surface in a first direction of travel;
   b) said frame assembly having a plurality of elongated members forming an emulsion receiving area bounded by said elongated members;
   c) said elongated members including a pair of side members extending parallel to said first direction of travel and forming a first side member and a second side member;
   d) each of said first and second side members having end blades connected thereto for contacting the pavement surface and for supporting a respective side member; and,
   e) said end blades being formed of brushes
   f) a front frame member extending between and connecting said first and second side members;
   g) a middle frame member spaced from said front frame member and extending between said first and second side members; and
   h) a rear flexible frame member spaced from both said front and said middle frame member; with a spring steel center section to allow the frame to follow the contour of the pavement surface; and,
   i) said front frame member includes a squeegee extending downwardly therefrom for preventing said liquid emulsion from flowing under said front frame member and said middle frame member and rear frame member each having a squeegee extending downwardly therefrom for applying said emulsion to the pavement surface when said sled is in motion.

2. The sled as set forth in claim 1, further comprising:
   a) a first pair of brackets connected to and extending outwardly from said front frame member;
   b) a caster connected to each of first pair said brackets and extending downwardly to contact the pavement and support said first frame member above the pavement.

3. The sled as set forth in claim 1, wherein:
   a) said front frame member includes a second set of brackets extending above said front frame member; and,
   b) each bracket of said second set of brackets having a pin reception opening to facilitate connection of said sled to a tow vehicle.

4. The sled as set forth in claim 1, further comprising:
   a) a hydraulic lift mechanism attached to said rigid frame assembly for lifting said assembly.

5. The sled as set forth in claim 1, further comprising:
   a) a drag brush connected to said frame assembly; and,
   b) said drag brush being positioned to trail behind said rear frame and contact the emulsion when the sled is in motion.

6. The sled as set forth in claim 1, further comprising:
   a) a woven mat connected to said frame assembly; and, b) said mat being positioned to trail behind said rear frame and contact the emulsion when the sled is in motion.

7. The sled as set forth in claim 1, further comprising:
a) a hopper assembly adapted for towing with said frame assembly;
b) said hopper assembly including a hopper for containing aggregate; and
c) said hopper includes a bottom opening for releasing aggregate onto the polymer emulsion.

8. The sled as set forth in claim 7, wherein:
a) said hopper assembly includes an aggregate deflector which aids in separation of the aggregate to facilitate the flow of aggregate through said opening.

9. The sled as set forth in claim 7, wherein:
a) said hopper assembly includes a gate adjacent said bottom opening;
b) said gate being operable to open and close said bottom opening to regulate the flow of aggregate though said bottom opening.

10. The sled as set forth in claim 9, wherein:
a) said gate is pneumatically operated.

11. The sled as set forth in claim 9, wherein;
a) a vibrator is attached to said gate to facilitate the flow of aggregate through said opening.

12. A method of applying a polymer emulsion to a pavement surface using a flexible sled, comprising:
a) attaching to a tow vehicle a flexible sled having a rigid frame assembly adapted to be towed along a pavement surface in a first direction of travel, said frame assembly having a plurality of elongated members forming an emulsion receiving area bounded by said elongated members, a pair of said elongated members extending parallel to said first direction of travel and forming a first side member and a second side member, each of said first and second side members having end blades connected thereto for contacting the pavement surface and for supporting said its respective side member, said end blades being formed of brushes and a front frame member extending between and connecting said first and second side members, a middle frame member spaced from said front frame member and extending between said first and second side members, a rear flexible frame member spaced from both said front and said middle frame member; with a spring steel center section to allow the frame to follow the contour of the surface, said front frame member includes a squeegee extending downwardly therefrom for preventing said liquid emulsion from flowing under said front frame member and said middle frame member and rear frame member each having a squeegee extending downwardly therefrom for applying said emulsion to the pavement when said sled is in motion;
b) applying a predetermined quantity of polymer emulsion at a predetermined rate to an area of pavement bounded by said front frame member, said side frame members and said middle frame member;
c) towing said sled over a pavement surface wherein said polymer emulsion flows under said middle frame member and said rear frame member to apply a thin coating of polymer emulsion to the pavement surface; and,
d) accommodating the variation of a pavement surface by flexing of said spring steel center section to apply a substantially uniform thickness of said polymer emulsion; and,
e) allowing said thin coating of polymer emulsion to dry.

13. The method as set forth in claim 12, further comprising the steps of:
a) towing a container of aggregate with said sled;
b) applying aggregate from said container to said polymer emulsion in a space bounded by said middle frame member, said side frame members and said rear frame member.

14. The method as set forth in claim 13, wherein:
a) the step of applying aggregate includes applying the aggregate at a variable rate to provide a variable friction coefficient.

15. A polymer emulsion composition pavement sealant for application to pavement surfaces for creating a high coefficient of friction comprising:
a) a mixture of polymer resin blended with a mixture of cement and angular sand aggregate and titanium dioxide to provide a solar reflectance index number that ranges from 0.30 to 0.38 and a friction number in the range of 45 to 55; and,
b) wherein said titanium dioxide retards bacterial growth on said pavement.

16. The polymer emulsion composition as set forth in claim 15, wherein;
a) the ratio of aggregate to cement is 70/30.

* * * * *